United States Patent Office 3,642,992
Patented Feb. 15, 1972

3,642,992
ORGANIC COMPOUNDS
John C. Babcock and J Allan Campbell, Kalamazoo, Mich., assignors to The Upjohn Company, Kalamazoo, Mich.
No Drawing. Continuation-in-part of application Ser. No. 114,621, June 5, 1961, which is a continuation-in-part of application Ser. No. 69,557, Nov. 6, 1960. This application Sept. 8, 1967, Ser. No. 666,465
Int. Cl. C07c 169/08
U.S. Cl. 424—238
5 Claims

ABSTRACT OF THE DISCLOSURE

This invention relates to novel 7α-methyl-17α-alkynylestradiols and processes for their preparation; more particularly to those compounds embraced by the Formula II

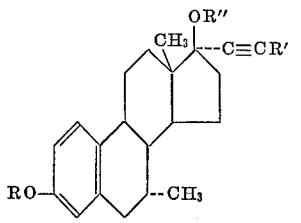

II wherein R is selected from the group consisting of hydrogen, the acyl radical of a hydrocarbon carboxylic acid containing from one through twelve carbon atoms, an alkyl radical containing from one through eight carbon atoms, tetrahydrofuranyl, tetrahydropyranyl, 5-substituted tetrahydropyranyl and a silyl radical of the formula

wherein $R_1$, $R_2$ and $R_3$ are selected from the group consisting of alkyl of one through six carbon atoms and phenyl, R' is selected from the group consisting of hydrogen and an alkyl radical containing from one through four carbon atoms and R" is selected from the group consisting of hydrogen, the acyl radical of a hydrocarbon carboxylic acid containing from one through twelve carbon atoms, and a silyl radical of the formula

wherein $R_1$, $R_2$ and $R_3$ have the same meaning as above.

CROSS REFERENCES TO RELATED APPLICATIONS

This application is a continuation-in-part of application Ser. No. 114,621, filed June 5, 1961, now Pat. No. 3,341,557 which is in turn a continuation-in-part of abandoned application Ser. No. 69,557, filed Nov. 6, 1960.

BRIEF SUMMARY OF THE INVENTION

The 7α-methyl-17α-alkynylestradiols of Formula II, above, can be prepared by the known methods described below.

(1) By treating 7α-methylestrone (I) (or its 3-ether) with an alkali metal derivative such as sodium acetylide, potassium acetylide, sodium or potassium methylacetylide, sodium or potassium ethylacetylide, sodium or potassium propylacetaylide, sodium butylacetylide, etc., in the presence of an inert solvent such as dioxane, dimethylformamide or dimethylsulfoxide, to yield the corresponding 7α-methyl-17α-alkynylestradiol derivative (II).

(2) By heating 7α-methylestrone (I) (or its 3-ether) with an alkynylmagnesium halide (prepared by slowly passing a gas such as acetylene, methylacetylene, propylacetylene, butylacetylene, etc., through an ethereal solution of an alkylmagnesium halide such as methylmagnesium bromide) in the presence of a solvent such as tetrahydrofuran, ether, benzene, etc., to yield a corresponding 7α-methyl-17α-alkynylestradiol derivative (II). Preferably, the Grignard reagent is employed in an excess of the order of 10 moles per mole of starting material (I).

The 3-acylates of the compounds of Formula II, above, are prepared by known methods for the esterification of 3-hydroxysteroids, for example by treating the appropriate 7α-methyl-17α-alkynylestradiol (II) wherein R is hydrogen with the desired hydrocarbon carboxylic acid anhydried in pyridine at from about 0° to 30° C. The 3,17-diacylates of the compounds of Formula II, above, are prepared by treating the appropriate 7α-methyl-17α-alkynylestradiol wherein R and R" are both hydrogen with the desired hydrocarbon carboxylic anhydride in refluxing pyridine. When R is alkyl, the corresponding 7α-methyl - 17α - (1-alkynyl)-estradiol 3-ether 17-acylate (II) is obtained.

The 17-esters of the compounds of Formula II, above, wherein R is alkyl, are also prepared by mixing together the appropriate 7α-methyl-17α-alkynylestradiol (II) and an organic carboxylic acid in the presence of trifluoroacetic anhydride. The foregoing procedure when applied to compounds of Formula II wherein R is hydrogen, first yields the 3,17-diesters; mild alkaline hydrolysis of the thus produced compounds or chromatography through a column of alumina (Grade II) (basic) removes the 3-ester group and yields the 17-monoesters (II).

The 3-ethers of the compounds of Formula II, above, can be prepared from the compounds of Formula II wherein R is hydrogen by the known methods described below.

(1) By treating a 7α-methyl-17α-alkynylestradiol of Formula (II) in accordance with the procedures disclosed in British Pat. 909,622, i.e., with an alkyl (or cycloalkyl) halide and an alkali metal alkylate, preferably at reflux temperature, to give a 3-alkyl (or cycloalkyl) ether of the 7α-methyl-17α-alkynylestradiol (II).

(2) By treating a 7α-methyl-17α-alkynylestradiol (II) with an alkylating agent (e.g., a dialkylsulfate) in conventional manner, to give a 3-alkyl ether of the 7α-methyl-17α-alkynylestradiol (II).

(3) By treating a 7α-methyl-17α-alkynylestradiol (II) with a cyclic enol ether (e.g., dihydrofuran, dihydropyran, 5 - hydroxymethyldihydropyran, 5 - carboxydihydropyran, etc.) at low temperature, preferably in the presence of an acidic catalyst (e.g., phoshorus oxychloride), to give the corresponding 3-ether (e.g., tetrahydrofuranyl, tetrahydropyranyl, 5 - hydroxymethyltetrahydropyranyl, etc.) of the 7α-alkynylestradiol (II).

(4) By treating a 7α-methyl-17α-alkynylestradiol (II) with a diazoalkane (e.g., diazomethane, diazoethane, diazobutane, etc.) at ambient temperature in an inert solvent such as ether, ethylene glycol dimethyl ether, etc., to give the corresponding 3-alkyl ether of the 7α-methyl-17α-alkynylestradiol (II).

(5) By treating a 7α-methyl-17α-alkynylestradiol (II) with a disilazane of the formula

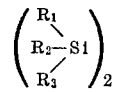

NH wherein $R_1$, $R_2$ and $R_3$ have the same meaning as above (e.g., hexamethyldisilazane, symmetrical diphenyltetramethyldisilazane, 1 - methyl-1,1-dibutyl-3-phenyl-3,3-dimethyldisilazane, hexa-amyldisilazane, etc.) to yield a corresponding 3-silyl ether of the 7α-methyl-17α-alkynylestradiol (II) and 3,17-bissilyl ether of the 7α-methyl-17α-alkynylestradiol (II) which can be separated by conventional procedure.

The 7α-methylestrone (I) starting material of (1) and (2), above, can be prepared by several known methods described below.

(1) By fermentation of 7α-methyl-19-nortestosterone (I) or 7α-methyl-19-nor-4-androstene-3,17-dione with a microorganism or its enzymes capable of introducing a double bond in the 1(2)- or 1(2)- and 4(5)-positions of the steroid nucleus, e.g., *Corynebacterium simplex* or *Septomyxa affinis*, to yield 7α-methylestrone (I).

(2) By catalytically dehydrogenating 7α-methyl-19-nor-4-androstene-3,17-dione at the 1(2)-position, e.g., by heating in the presence of a hydrogenation catalyst (e.g., palladium on charcoal) in a high boiling solvent (e.g., p-cymene), to give 7α-methylestrone (I).

(3) By treating 7α-methyl-19-nor-4-androstene-3,17-dione with a chemical dehydrogenating agent, e.g., a quinone such as 2,3-dichloro-5,6-dicyanobenzoquinone (DDQ) or 2,3,5,6-tetrachloro-1,4-benzoquinone (chloranil), or selenium compounds such as selenium dioxide or dibenzoyloxy selenium oxide, to yield 7α-methylestrone (I).

(4) By pyrolysis of 7α-methyl-1,4-androstadiene-3,17-dione at elevated temperatures (e.g., between about 400 to 600° C.) in high boiling diluents (e.g., heavy mineral oil) to give 7α-methylestrone (I).

(5) By treating 7α-methyl-1,4-androstadiene-3,17-dione in accordance with the procedures described in J. Amer. Chem. Soc. 86, 742, i.e., with lithium and diphenyl in the presence of diphenylmethane and employing tetrahydrofuran as solvent, to yield 7α-methylestrone (I).

The 3-ethers of 7α-methylestrone (I) can be prepared by the known methods described above for the preparation of the 3-ethers of 7α-methyl-17α-alkynylestradiol.

The 3-acylates of 7α-methylestrone (I) can be prepared by conventional procedures, e.g., by treating 7α-methylestrone (I) with the appropriate organic carboxylic acid anhydride (or chloride) at moderate temperatures in the presence of an esterification catalyst such as pyridine, to yield the corresponding 7α-methylestrone 3-acylate (I).

All of the compounds included within Formulae I and II, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The compounds of Formula II of the present invention are potent estrogens when administered either orally or parenterally; e.g., when assayed in rats by the Allen-Doisy test 7α-methyl-17α-ethynylestradiol 3-methyl ether (II) was found to have approximately twenty times the activity of estradiol. The compounds of Formula II when administered to mammals, birds and other animals, are also active in lowering cholesterol in the blood, inhibiting gonadotropin secretion, producing anabolic response, especially in providing nitrogen retention, and in supplying calcium lost as a result of osteoporosis. In addition, the compounds of Formula II, when combined with progestins such as 6α-methyl-17α-hydroxyprogesterone 17-acetate (Provera), 7α-methyl-17α-ethynyl - 19 - nortestosterone, 17α-hydroxy-6-methyl-16-methylene - 4,6 - pregnadiene-3,20-dione 17-acetate (Melengestrol acetate), 17-hydroxy-19-nor-17α-pregn-(10)-en-20-yn-3-one (Norethynodrel), 19-nor-17α-pregn - 4 - en - 20 - yne-3β,17-dioldiacetate (Ethynodiol diacetate), 17-hydroxy-19-nor-17α-pregn-4-en-20-yn-3-one (Norethindrone), the corresponding 17-acetate (Norethindrone acetate), 6α,21-dimethyl-17β-hydroxy-4-pregnen-20-yn-3-one (Dimethisterone), 6-chloro-17α-hydroxy-4,6-pregnadiene-3,20-dione 17-acetate, etc., are useful for the prevention of ovulation in mammals. The foregoing properties make the new compounds useful in veterinary practice.

The compounds of the invention can be prepared and administered to mammals, birds and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

Example 1.—7α-methylestrone(7α-methyl-1,3,5(10)-estratrien-3-ol-17-one) (I)

To 10 l. of sterile glucose-yeast extract medium there was added an inoculum of 500 ml. of *Corynebacterium simplex* ATCC 6946. The culture was stirred and aerated for about 48 hours at a temperature of about 28° C., lard oil being added to suppress the foam. After about 48 hours the pH was 6.1. To the fermentor, 1 g. of 7α-methyl-19-nortestosterone, prepared as in Steroids 1, 317, was added and aeration continued for about 24 hours. At this time the pH was 6.5. The beer was adjusted to pH 3 with hydrochloric acid and extracted four times with 3 l. of methylene chloride. Paper chromatography of an aliquot of the solvent extract indicated, by the Bush B–3 system, that essentially all of the 7α-methyl-19-nortestosterone had been reacted and that two compounds showing the characteristics of aromatic A ring steroids were present. The less polar compound had the mobility of 7α-methylestrone (I) and the more polar that of 7α-methylestradiol. The methylene chloride extracts were evaporated to dryness and the residues obtained used for isolating the fermentation products. The crude residue was dissolved in methylene chloride and chromatographed through a 150 gm. Florisil (synthetic magnesium silicate) column packed wet with Skellysolve B (hexanes) and eluted with 400 ml. fractions by gradient elution between 5 l. of 4% acetone-Skellysolve B and 5 l. of 12% acetone-Skellysolve B. Fractions 4 through 7 gave well formed crystals. These fractions were combined and recrystallized from methanol with Darco (activated charcoal) treatment to give 0.45 g. of 7α-methylestrone (I), melting at 237 to 238° C.;

$\lambda_{max}^{alc.}$ 280 mμ; ε=2,100.

*Analysis.*—Calcd. for $C_{19}H_{24}O_2$ (percent): C, 80.21; H, 8.51. Found (percent): C, 80.10; H, 8.34.

7α-methylestradiol can be isolated from the more polar fractions.

Example 2.—7α-methylestrone (I)

A sterile medium was prepared containing 10 l. of tap water, 20 g. of cornsteep liquors and 100 g. of commercial dextrose and adjusted to pH 5 with sodium hydroxide. This was inoculated with 500 ml. of a vegetative growth of *Septomyxa affinis* (ATCC 6737) grown on the same medium. The culture was stirred and aerated at a rate of 0.1 l./minute. At the end of about 24 hours the pH was 7. To the fermentor, 2 g. of 7α-methyl-19-nortestosterone and 0.1 g. of 3-ketobisnor-4-cholen-22-al dissolved in 20 ml. of N,N-dimethylformamide was added. Aeration was continued for about 48 hours, the pH adjusted to 3 and the beer extracted four times with methylene chloride. Paper chromatography indicated the presence of 7α-methylestrone (I) in the extract.

The product (I) can be isolated in accordance with the procedure described in Example 1 to give pure 7α-methylestrone (I).

Example 3.—7α-methylestrone (I)

A mixture of 100 mg. of 7α-methyl-19-4-androstene-3,17-dione, 40 mg. of 5% palladium on charcoal catalyst in 100 ml. of p-cymene (purified by passing through a column of alumina) was refluxed for about 1.5 hours. The catalyst was removed by filtration and the filtrate concentrated in a rotary evaporator. The residue was crystallized from ether to give 25 mg. of 7α-methylestrone (I), melting at 218 to 230° C., $\lambda_{max.}^{alc.}$ 279 mμ, ε=2,150. Infrared spectral analysis indicates it is the same compound as prepared in Examples 1 and 2. The product (I) can be further purified by recrystallization or chromatography to give pure 7α-methylestrone (I).

Example 4.—7α-methylestrone (I)

To a solution of 100 mg. of 7α-methyl-19-nor-4-androstene-3,17-dione, 100 mg. of 2,3-dichloro-5,6-dicyanobenzoquinone (DDQ) and 0.5 ml. of acetic acid in 3 ml. of dioxane, 2 drops of 2.8 N hydrochloric acid solution in dioxane was added. After standing for about 16 hours, methylene chloride was added to the mixture and the DDQ filtered off. The filtrate was dried and the solvent removed. The residue, weighing about 30 mg., was triturated with methanol to give about 1 mg. of 7α-methylestrone (I) with $\lambda_{max.}^{alc.}$ 280 mμ, ε=2,350. Infrared analysis indicated that the thus produced compound is the same as those prepared in Examples 1, 2 and 3.

Following the procedure of Example 4, but substituting selenium dioxide or tetrachloro - p - benzoquinone (chloranil) for DDQ, also yields 7α-methylestrone (I).

Example 5.—7α-methylestrone (I)

A pyrolysis tube (18" x 1") equipped with the thermocouples about 3" from each end and packed with glass tubing cut in about ¼" lengths was heated to about 550° C. and heavy mineral oil passed through at a rate of 5 ml./minute until constant temperature of 500 to 510° C. at the top and 540 to 560° C. at the bottom was obtained. A mixture of 10.4 g. of 7α-methyl-1,4-androsta-diene-3,17-dione and 500 ml. of heavy mineral oil mixed in a Waring blender was added at a rate of 5 ml./minute, maintaining the above temperatures. The effluent was refrigerated for several hours and the crystalline precipitate collected, washed thoroughly with Skellysolve B and dried to give 6.7 g. of crude 7α-methylestrone (I). It was dissolved hot methylene chloride, cooled and poured on a 350 g. Florisil column packed wet with Skellysolve B and eluted with 400 ml. fractions by gradient elution between 5 l. of 4% acetone-Skellysolve B and 5 l. of 12% acetone-Skellysolve B. The desired product was contained in fractions 10 through 21. The residues obtained from these fractions were combined and recrystallized from methanol to give 3.75 g. of 7α-methylestrone (I), having a melting point of 230 to 235° C.; [α]$_D$ +140° (chloroform);

$\lambda_{max.}^{alc.}$ 279 mμ; ε=2,250. Its nuclear magnetic resonance (NMR) spectrum confirms the proposed structure and infrared spectral analysis shows it is the same as the product obtained in Examples 1, 2, 3 and 4.

Example 6.—7α-methylestrone (I)

Treating 7α-methyl-1,4-androstadiene-3,17-dione in accordance with the procedures described in J. Amer. Chem. Soc. 86, 742, namely, with lithium and diphenyl in the presence of diphenyl methane and employing tetrahydrofuran as solvent, yields 7α-methylestrone (I).

Example 7.—7α-methylestrone 3-cyclopentyl ether (I)

A mixture of 1 g. of 7α-methylestrone (I) and 1 g. of cyclopentyl bromide is added slowly to a solution of sodium ethylate (prepared from 0.1 g. of sodium and 8 ml. of absolute ethanol). The reaction mixture is heated to reflux for about 4 hours, the ethanol removed by distillation and the residue treated with a small amount of water. A precipitate of 7α-methylestrone 3-cyclopentyl ether (I) is obtained which is crystallized from a mixture of methylene chloride and methanol.

Example 8.—7α-methylestrone 3-methyl ether (I)

To 4 g. of 7α-methylestrone (I) in a solution containing 6.4 g. of potassium hydroxide, 14 ml. of water and 21 ml. of methanol, 14 ml. of dimethyl sulfate was added dropwise with stirring and cooling sufficient to keep the reaction temperature at 25 to 35° C. At the same time a solution of 14 g. of potassium hydroxide in 28 ml. of water and 42 ml. of methanol was added dropwise at a rate that kept the pH of the reaction mixture about 10. The addition of the dimethylsulfate required about 30 minutes and the addition of the potassium hydroxide solution about 1 hour. The reaction mixture was stirred an additional 1.5 hours. Water was added and the crystalline product collected on a filter, washed with water and dried to yield 3.8 g. of product (I) melting at 155 to 163° C. It was recrystallized from methanol to give an analytical sample of 7α-methylestrone 3-methyl ether (I) melting point 163 to 165°;

$\lambda_{max.}^{alc.}$ 276 mμ; ε=2,100;

$\lambda_{max.}^{alc.}$ 286 mμ; ε=2,050.

Analysis.—Calcd. for $C_{20}H_{28}O_2$ (percent): C, 79.95; H, 9.39. Found (percent): C, 80.28; H, 9.48.

Following the procedure of Example 8 but substituting for dimethylsulfate the following:

(1) diethylsulfate,
(2) dipropylsulfate,
(3) diisopropylsulfate,
(4) dibutylsulfate,
(5) di-s-butylsulfate,
(6) dipentylsulfate,
(7) dihexylsulfate,
(8) diheptylsulfate and
(9) dioctylsulfate, yields, respectively, (1) 7α-methylestrone 3-ethyl ether (I),
(2) 7α-methylestrone 3-propyl ether (I),
(3) 7α-methylestrone 3-isopropyl ether (I),
(4) 7α-methylestrone 3-butyl ether (I),
(5) 7α-methylestrone 3-s-butyl ether (I),
(6) 7α-methylestrone 3-pentyl ether (I), (7) 7α-methylestrone 3-hexyl ether (I),
(8) 7α-methylestrone 3-heptyl ether (I) and
(9) 7α-methylestrone 3-octyl ether (I).

Example 9.—7α-methylestrone 3-tetrahydropyranyl ether (I)

To a solution of 4 g. of 7α-methylestrone (I) in 40 ml. of tetrahydrofuran (purified by percolation through a column of alumina) and 8 ml. of freshly distilled dihydropyran, 0.4 ml. of phosphorus oxychloride was added dropwise with stirring under nitrogen and cooling in an ice bath. After the addition was completed the ice bath was removed and after an additional 15 minutes the reaction mixture was poured into a mixture of saturated solution of sodium bicarbonate, ether and ice. The ether layer was separated, washed with dilute sodium bicarbonate solution, water, dried over sodium sulfate and filtered. The filtrate was evaporated to dryness to give 5.1 g. of 7α-methylestrone 3-tetrahydropyranyl ether (I).

Following the procedure of Example 9 but substituting for dihydropyran the following:

(1) dihydrofuran,
(2) 5-hydroxymethyldihydropyran,
(3) 5-carboxydihydropyran, etc., yields, respectively, (1) 7α-methylestrone 3-tetrahydrofuranyl ether (I),
(2) 7α-methylestrone 3-(5 - hydroxymethyl)tetrahydropyranyl ether (I),
(3) 7α-methylestrone 3-(5 - carboxy)tetrahydropyranyl ether (I), etc.

Example 10.—7α-methylestrone 3-acetate (I)

To 1 g. of 7α-methylestrone (I), 2 ml. of pyridine and 1 ml. of acetic anhydride is added. The reaction mixture is kept at room temperature for about three hours; water is then added to precipitate the product (I) and destroy the excess acetic anhydride. Recrystallization from acetone and Skellysolve B yields 7α-methylestrone 3-acetate (I).

Following the procedure of Example 10 but substituting for acetic anhydride the following:

(1) benzoic acid anhydride,
(2) propionic anhydride,
(3) butyryl chloride,
(4) i-valeryl chloride,
(5) decanoyl chloride,
(6) hexanoic anhydride,
(7) sec. octanoic anhydride
(8) capric anhydride,
(9) undecyl anhydride,
(10) dodecanoyl chloride, etc., yields, respectively, (1) 7α-methylestrone 3-benzoate (I),
(2) 7α-methylestrone 3-propionate (I),
(3) 7α-methylestrone 3-butyrate (I),
(4) 7α-methylestrone 3-i-valerate (I),
(5) 7α-methylestrone 3-decanoate (I),
(6) 7α-methylestrone 3-hexanoate (I),
(7) 7α-methylestrone 3-sec. octanoate (I),
(8) 7α-methylestrone 3-caproate (I),
(9) 7α-methylestrone 3-undecanoate (I),
(10) 7α-methylestrone 3-dodecanoate (I), etc.

Example 11.—7α-methylestrone 3-trimethylsilyl ether (I)

To a suspension of 4 g. of 7α-methylestrone (I) in 10 ml. of dry acetone, 6.5 ml. of hexamethyldisilazane was added. The mixture was stirred for about four days and then evaporated to dryness. The residue was dissolved in a mixture of methylene chloride and Skellysolve B and chromatographed over a 250 g. column of Florisil. Gradient elution between 5 l. of Skellysolve B and 5 l. of 10% acetone-90% Skellysolve B yielded 2.5 g. of 7α-methyl-estrone-3-trimethylsilyl ether (I) having a melting point of 103 to 107° C.

Following the procedure of Example 11 but substituting other disilazanes for hexamethyldisilazine, such as symmetrical diphenyltetramethyldisilazane, hexaamyldisilazane, etc., yields respectively, 7α-methylestrone 3-phenyldimethylsilyl ether (I), 7α-methylestrone 3-triamylsilyl ether (I), etc.

The reactions of Example 11 and the paragraph thereafter are preferably carried out with the addition of a few drops to 2 ml. of trimethylsilyl chloride.

In place of acetone in Example 11, other inert dry solvents, such as tetrahydrofuran, dioxane, methylene chloride and the like, can be utilized.

Example 12.—7α-methyl-17α-ethynylestradiol (II)

To about 30 ml. of liquid ammonia cooled in a Dry-Ice (solid carbon dioxide)acetone bath, 1 g. of potassium was added. Acetylene was added until the blue color disappeared, then 0.3 g. of 7α-methylestrone (I) in 8 ml. of dioxane was added. The resulting solution was refluxed for about ½ hour then most of the ammonia allowed to escape. Water was added, the solution neutralized with hydrochloric acid and extracted with ether. The extracts were washed with dilute hydrochloric acid, water, dilute sodium bicarbonate, again with water, dried and the solvent removed. The residue resisted crystallization. It was combined with 100 mg. of another run of the same crude product in methylene chloride and then chromatographed through a colum of Florisil. The fractions that crystallized on scratching from methylene chloride-water-Skellysolve B then from methylene chloride-Skellysolve B gave 0.28 g. of partially solvated 7α - methyl - 17α-ethynylestradiol (II), melting at 105° C. with bubbling. On drying at 100° C. under high vacuum the product changed to an amorphous solid with $$\lambda_{max.}^{alc.}$$

280 mμ; ε=2,190.

Following the procedure of Example 12 but substituting other starting materials for 7α-methylestrone (I), such as 7α-methylestrone 3-methyl ether (I), 7α-methylestrone 3-cyclopentyl ether (I), 7α-methylestrone 3-tetrahydropyranyl ether (I) etc., yields, respectively, 7α-methyl-17α-ethynylestradiol 3-methyl ether (II), 7α-methyl-17α-ethynylestradiol 3-cyclopentyl ether (II), 7α-methyl-17α-ethynylestradiol 3-tetrahydropyranyl ether (II), etc.

Alternatively, 7α-methylestrone (I) and its 3-ethers can be converted to the corresponding 7α-methyl-17α-ethynylestradiols (II) by reaction with lithium acetylide-ethylenediamine complex in such solvents as dimethylsulfoxide, dimethylformamide, tetrahydrofuran and other unreactive organic solvents. For example, by employing this procedure, 7α-methylestrone 3-tetrahydropyranyl ether (I) is converted to 7α-methyl-17α-ethynylestradiol 3-tetrahydropyranyl ether (II).

Substitution of methylacetylene (propyne), ethylacetylene (1-butyne), propylacetylene (1-pentyne), butylacetylene (1-hexyne), etc., in Example 12 and the procedures of the paragraphs thereafter yields the corresponding 7α-methyl - 17α - propynyl, butynyl, pentynyl, hexynyl, etc., derivatives (II).

Example 13.—7α - methyl - 17α - (1 - propynyl)estradiol 3 - methyl ether - [7α - methyl - 17α(1 - propynyl)estra-1,3,5(10) - triene - 3,17 - diol 3 - methyl ether] - (II)

Methylacetylene gas is slowly passed into 150 ml. of a 3 N ethereal solution of methylmagnesium bromide intermittently for about 96 hours, ether being added as needed to keep the volume of the solution between about 125 and 200 ml. To the aforesaid Grignard mixture, 5 g. of 7α-methylestrone 3-methyl ether (I) in 300 ml. of purified tetrahydrofuran is added. The reaction mixture is distilled until the temperature reaches 50 to 55° C., then refluxed for about 20 hours. It is then poured into a mixture of ice and ammonium chloride solution and extracted with ether. The ether extract is washed first with ammonium chloride solution then water, dried over sodium sulfate, filtered and concentrated to dryness. The product (II) is chromatographed through a column of alumina (Grade II) neutral to separate it from unreacted starting material (I). Recrystallization from a mixture of acetone and Skellysolve B yields 7α-methyl-17α-(1-propynyl) estradiol 3-methyl ether (II).

Following the procedure of Example 13 but substituting for methylacetylene other acetylenes such as the following:

(1) ethylacetylene,
(2) propylacetylene,
(3) butylacetylene, etc., yields, respectively, (1) 7α-methyl-17α-(1-butynyl)estradiol 3-methyl ether (II),
(2) 7α-methyl-17α-(1-pentynyl)estradiol 3-methyl ether (II),
(3) 7α-methyl-17α-(1-hexynyl)estradiol 3-methyl ether (II), etc.

Following the procedure of Example 13 and the paragraph thereafter but substituting 7α-methylestrone (I), 7α-methylestrone 3-methyl ether (I), 7α-methylestrone 3-cyclopentyl ether (I) and 7α-methylestrone 3-tetrahydropyranyl ether (I) as starting material, yields the corresponding 7α-methyl-17α-(1-alkynyl)-estradiol derivative (II).

Example 14.—7α-methyl-17α-ethynylestradiol 3-methyl ether (II)

Following the procedure of Example 8 but substituting 7αmethyl-17α-ethynylestradiol for 7α-methylestrone as starting material yields 7α-methyl-17α-ethynylestradiol 3-methyl ether.

Following the procedure of Example 8 but substituting 7α-methyl-17α-ethynylestradiol for 7α-methylestrone as starting material and substituting for dimethylsulfate the following:

(1) diethylsulfate,
(2) dipropylsulfate,
(3) diisopropylsulfate,
(4) dibutylsulfate,
(5) di-s-butylsulfate,
(6) dipentylsulfate,
(7) dihexylsulfate,
(8) diheptylsulfate and
(9) dioctylsulfate yields, respectively, (1) 7α-methyl-17α-ethynylestradiol 3-ethyl ether (II),
(2) 7α-methyl-17α-ethynylestradiol 3-propyl ether (II),
(3) 7α-methyl-17α-ethynylestradiol 3-isopropyl ether (II),
(4) 7α-methyl-17α-ethynylestradiol 3-butyl ether (II),
(5) 7α-methyl-17α-ethynylestradiol 3-s-butyl ether (II),
(6) 7α-methyl-17α-ethynylestradiol 3-pentyl ether (II),
(7) 7α-methyl-17α-ethynylestradiol 3-hexyl ether (II),
(8) 7α-methyl-17α-ethynylestradiol 3-heptyl ether (II) and
(9) 7α-methyl-17α-ethynylestradiol 3-octyl ether (II).

Following the procedure of Example 8 and the following paragraph but substituting for 7α-methylestrone the following:

(1) 7α-methyl-17α-(1-propynyl)estradiol (II),
(2) 7α-methyl-17α-(1-butynyl)estradiol (II),
(3) 7α-methyl-17α-(1-pentynyl)estradiol (II) and
(4) 7α-methyl-17α-(1-hexynyl)estradiol (II)

yields the corresponding 7α-methyl-17α-(1-alkynyl)-estradiol 3-ethers.

Example 15.—7α-methyl-17α-ethynylestradiol 3-trimethylsilyl ether (II)

To a suspension of 4 g. of 7α-methyl-17α-ethynylestradiol (II) in 10 ml. of dry acetone, 6.5 ml. of hexamethyldisilazane is added. The mixture is stirred for about four days and then evaporated to dryness. The residue is dissolved in a mixture of methylene chloride and Skellysolve B and chromatographed over a 200 g. column of Florisil. The product is eluted by gradient elution between Skellysolve B and 10% acetone in Skellysolve B to give 7α-methyl-17α-ethynylestradiol 3-trimethylsilyl ether (II) exhibiting OH absorption in the infrared and 7α-methyl-17α-ethynylestradiol 3,17-bistrimethylsilyl ether (II) and exhibiting no OH absorption in the infrared.

Following the procedure of Example 15 but substituting other disilazanes for hexamethyldisilazane, such as symmetrical diphenyltetramethyldisilazane, hexaamyldisilazane, etc., yields respectively, 7α-methyl-17α-ethynylestradiol 3-phenyldimethylsilyl ether (II), 7α-methyl-17α-ethynylestradiol 3-triamylsilyl ether (II), etc.

The reactions of Example 15 and the paragraph thereafter are preferably carried out with the addition of a few drops to 2 ml. of trimethylsilyl chloride.

In place of acetone in Example 15, other inert dry solvents, such as tetrahydrofuran, dioxane, methylene chloride and the like, can be utilized.

Following the procedure of Example 15 and the paragraph thereafter but substituting for 7α-methyl-17α-ethynylestradiol (II) the following:

(1) 7α-methyl-17α-(1-propynyl)estradiol (II),
(2) 7α-methyl-17α-(1-butynyl)estradiol (II),
(3) 7α-methyl-17α-(1-pentynyl)estradiol (II) and
(4) 7α-methyl-17α-(1-hexynyl)estradiol (II)

yields the corresponding 7α-methyl-17α-(1-alkynyl)-estradiol 3-silyl ethers (II).

Following the procedure of Example 15, some disilylation occurs, producing 7α-methyl-17α-ethynylestradiol 3,17-bis-trimethylsilyl ether (II). Following the procedure of Example 15 but increasing the amount of hexamethyldisilazane from 6.5 ml. to 10 ml. and if desired increasing the reaction time results in the formation of mainly 7α-methyl-17α-ethynylestradiol 3,17-bistrimethylsilyl ether (II), which can be purified by chromatography as described above.

Following the above modified procedure of Example 15 using increased amounts of disilazanes but substituting other disilazanes for hexamethyldisilazane, such as symmetrical diphenyltetramethyldisilazane, hexaamyldisilazane, etc., yields, respectively, 7α-methyl-17α-ethynylestradiol 3,17-bisphenyldimethylsilyl ether (II), 7α-methyl-17α-ethynylestradiol 3,17-bistriamylsilyl ether (II), etc.

Example 16.—7α-methyl-17α-ethynylestradiol 3-acetate (II)

To 1 g. of 7α-methyl-17α-ethynylestradiol (II) 2 ml. of pyridine and 1 ml. of acetic anhydride is added. The reaction mixture is kept at room temperature for about three hours; water is then added to precipitate the product (II) and destroy the excess acetic anhydride. Recrystallization from acetone and Skellysolve B yields 7α-methyl-17α-ethynylestradiol 3-acetate (II).

Following the procedure of Example 10 and allowing additional reaction time for the slower acting anhydrides but substituting for acetic anhydride the following:

(1) benzoic acid anhydride,
(2) propionic anhydride,
(3) i-butyryl chloride,
(4) valeryl chloride,
(5) decanoyl chloride,
(6) hexanoic anhydride,
(7) sec. octanoic anhydride, (8) capric anhydride,
(9) undecyl anhydride,
(10) dodecanoyl chloride, etc., yields, respectively, (1) 7-α-methyl-17α-ethynylestradiol 3-benzoate (II),
(2) 7α-methyl-17α-ethynylestradiol 3-propionate (II),
(3) 7α-methyl-17α-ethynylestradiol 3-i-butyrate (II),
(4) 7α-methyl-17α-ethynylestradiol 3-valerate (II),
(5) 7α-methyl-17α-ethynylestradiol 3-decanoate (II),
(6) 7α-methyl-17α-ethynylestradiol 3-hexanoate (II),
(7) 7α-methyl-17α-ethynylestradiol 3-sec. octanoate (II),
(8) 7α-methyl-17α-ethynylestradiol 3-caproate (II),
(9) 7α-methyl-17α-ethynylestradiol 3-undecanoate (II),
(10) 7α-methyl-17α-ethynylestradiol 3-dodecanoate (II), etc.

Following the procedure of Example 16 and the paragraph thereafter but substituting for 7α-methyl-17α-ethynylestradiol (II) other starting materials, such as 7α-methyl-17α-(1-propynyl) estradiol (II), 7α-methyl-17α-(1-pentynyl) estradiol (II), and 7α-methyl-17α-(1-hexynyl)estradiol (II) yields the corresponding 7α-methyl-17α-(1-alkynyl)estradiol 3-acylate.

Example 17.—7α-methyl-17α-ethynylestradiol 3,17-diphenylacetate (II)

A mixture of 0.75 ml. of trifluoroacetic anhydride and 1.5 g. of phenylacetic acid was heated at about 70° C. for about 10 minutes, cooled in an ice bath and 600 mg. of 7α-methyl-17α-ethynylestradiol (II) added. The ice bath was removed and after about 2 hours water was added to the mixture. The crude product was extracted with ether, washed first with dilute sodium carbonate solution, then water, dried over magnesium sulfate and filtered. The solvent was removed leaving a residue of 7α-methyl - 17α - ethynylestradiol 3,17-diphenylacetate (II). The product can be further purified if desired by chromatography over silica gel and by crystallization.

Following the procedure of Example 17 but substituting for phenylacetic acid other acids, such as acetic, propionic, butyric, isobutyric, valeric, decanoic, acrylic, benzoic, naphthoic, phenylpropionic, cyclopentylpropionic, cyclohexylcarboxylic, etc., yields the corresponding 3,17-diester of 7α-methyl-17α-ethynylestradiol (II).

Following the procedure of Example 17 and the paragraph thereafter but substituting for 7α-methyl-17α-ethynylestradiol (II) other starting materials, such as 7α-methyl-17α-(1-propynyl)estradiol (II), 7α-methyl-17α-(1-butynyl)estradiol (II), 7α-methyl-17α-(1-pentynyl)estradiol (II), 7α-methyl-17α-(1-hexynyl)estradiol (II), yields the corresponding 7α-methyl-17α-(1-alkynyl)estradiol 3,17-diester (II).

Example 18.—7α-methyl-17α-ethynylestradiol 17-phenylacetate (II)

The 7α-methyl-17α-ethynylestradiol 3,17-diphenylacetate (II) obtained in Example 17 was chromatographed through a column of alumina (Grade II) (neutral). The 3-ester group was removed and 7α-methyl-17α-ethynylestradiol 17-phenylacetate (II) obtained as a glassy foam;

$\lambda_{max}^{alc.}$ 279.5 mμ; ε=2,220. The NMR and infrared spectra support the molecular structure of the compound.

Following the procedure of Example 18 but substituting for 7α-methyl-17α-ethynylestradiol 3,17-diphenylacetate (II) other 3,17-diesters of 7α-methyl-17α-ethynylestradiol, such as the 3,17-diacetate, 3,17-dipropionate, 3,17-dibutyrate, 3,17-divalerate, 3,17-dibenzoate, 3,17-dicyclopentylpropionate, etc., yields the corresponding 7α-methyl-17α-ethynylestradiol 17-ester (II).

Following the procedure of Example 18 and the paragraph thereafter but substituting for 7α-methyl-17α-ethynylestradiol 3,17-diesters (II) other starting materials, such as a 7α-methyl-17α-(1-propynyl)estradiol 3,17-diester (II), 7α-methyl-17α-(1-butynyl)estradiol 3,17-diester (II), 7α - methyl-17α-(1-pentynyl)estradiol 3,17 - diester (II), etc., yields the corresponding 7α-methyl-17α-(1-alkynyl)estradiol 17-ester (II).

An alternate procedure for the preparation of 7α-methyl-17α-ethynylestradiol 17-phenylacetate is to use mild basic hydrolysis. To a solution of 2.5 g. of potassium carbonate in 25 ml. of water is added 225 ml. of methanol, followed by 5.0 g. of 7α-methyl-17α-ethynylestradiol 3,17-diphenylacetate (II). The mixture is stirred for about two hours at about 20° C. then is poured into 700 ml. of water with efficient stirring, resulting in precipitation of 7α-methyl-17α-ethynylestradiol 17-phenylacetate (II), which is then separated, e.g., by filtration, and dried. The product can be further purified by chromatography over Florisil or alumina as described above.

Following the alternate procedure of Example 18 given immediately above but substituting for 7α-methyl-17α-ethynylestradiol 3,17-diphenylacetate (II) other 3,17-diesters of 7α-methyl-17α-(1-alkynyl)estradiols yields the corresponding 7α-methyl - 17α - (1-alkynyl)estradiol 17-ester (II).

Example 19.—7α-methyl-17α-ethynylestradiol 17-phenylacetate 3-trimethylsilyl ether (II)

Following the procedure of Example 15, but substituting for 7α-methyl-17α-ethynylestradiol a 7αmethyl-17α-(1-alkynyl)-estradiol 17-acylate, e.g., the following:

(1) 7α-methyl-17α-ethynylestradiol 17-phenylacetate (II),
(2) 7α-methyl-17α-(1-propynyl)estradiol 17-acetate (II),
(3) 7α-methyl-17α-(1-butynyl)estradiol 17-benzoate (II),
(4) 7α - methyl - 17α-(1-pentynyl)estradiol 17-propionate (II),
(5) 7α-methyl-17α-(1-hexynyl)estradiol 17-acetate (II), etc., yields, respectively, (1) 7α-methyl-17α-ethynylestradiol 3-trimethylsilyl ether 17-phenylacetate (II),
(2) 7α-methyl-17α-(1-propynyl)estradiol 3-trimethylsilyl ether 17-acetate (II),
(3) 7α-methyl-17α-(1-butynyl)estradiol 3 - trimethylsilyl ether 17-benzoate (II),
(4) 7α-methyl-17α(1-pentynyl)estradiol 3 - trimethylsilyl ether 17-propionate (II),
(5) 7α-methyl-17α-(1-hexynyl)estradiol 3 - trimethylsilyl ether 17-acetate (II), etc.

Further substituting other disilazanes for hexamethylsilazane, e.g. symmetrical diphenyltetramethyldisilazane, hexaamyldisilazane, etc., yields the corresponding 7α-methyl-17α-(1-alkynyl)estradiol 3-silyl ether 17-acylate (II).

Example 20.—7α-methyl-17α-ethynylestradiol 17-phenylacetate 3-methyl ether (II)

A mixture of 0.75 ml. of trifluoroacetic anhydride and 1.5 g. of phenylacetic acid is heated at about 70° C. for about 10 minutes, cooled in an ice bath and 600 mg. of 7α-methyl-17α-ethynylestradiol 3-methyl ether (II) added. The ice bath is removed and after about 2 hours water is added to the mixture. The crude product is extracted with ether, washed first with dilute sodium carbonate solution, then water, dried over magnesium sulfate and filtered. The solvent is removed, the residue dissolved in acetone and Skellysolve B and chromatographed through a column of Florisil to give 7α-methyl-17α-ethynylestradiol 17-phenylacetate 3-methyl ether (II).

Following the procedure of Example 20 but substituting 7α-methyl-17α-ethynylestradiol 3-cyclopentyl ether (II) for 7α-methyl-17α-ethynylestradiol 3-methyl ether (II), yields 7α-methyl - 17α - ethynylestradiol 17-phenylacetate 3-cyclopentyl ether (II).

Following the procedure of Example 20 and the paragraph thereafter but substituting for phenylacetic acid other acids, such as acetic, propionic, isovaleric, acrylic, benzoic, cyclopentylpropionic, etc., yields the corresponding 17-ester of 7α-methyl-17α-ethynylestradiol 3-methyl ether (II) or its 3-cyclopentyl ether (II).

Following the procedure of Example 20 and the two paragraphs thereafter but substituting for 7α-methyl-17α-ethynylestradiol 3-methyl ether (II) or its 3-cyclopentyl ether (II), other starting materials such as the 3-methyl ethers or 3-cyclopentyl ethers of 7α-methyl-17α-(1-propynyl)estradiol (II), 7α-methyl-17α-(1-butynyl)estradiol (II), 7α-methyl-17α-(1-hexynyl)estradiol (II), etc., yields, respectively, the corresponding 3-methyl ethers or 3-cyclopentyl ethers of 7α-methyl-17α-(1-propynyl)estradiol 17-acylate (II), 7α-methyl-17α-(1-butynyl)estradiol 17-acylate (II), 7α-methyl-17α-(1-hexynyl)estradiol 17-acylate (II), etc.

Example 21.—7α-methyl-17α-ethynylestradiol 3-cyclopentyl ether 17-trimethylsilyl ether (II)

Following the procedure of Example 15, but substituting for 7α-methyl-17α-ethynylestradiol (II), 7α-methyl-17α-ethynylestradiol 3-cyclopentyl ether (II) there is produced 7α-methyl-17α-ethynylestradiol 3-cyclopentylether 17-trimethylsilyl ether (II). Substituting other 3-alkyl or cycloalkylethers or 3-tetrahydropyranyl ethers and the like of 7α-methyl-17-ethynylestradiol (II) in the procedure of Example 21 gives the corresponding 17-trimethylsilyl ethers (II).

Further, substituting other disilazanes for hexamethyldisilazane affords the corresponding 7α-methylestradiol 3-ether 17-silyl ether (II).

Example 22.—7α-methyl - 17α - ethynylestradiol 3-acetate 17-phenylacetate (II)

Following the procedure of Example 16 but substituting 7α-methyl-17α-ethynylestradiol 17-phenylacetate (II) for 7α-methyl-17α-ethynylestradiol (II) as starting material yields 7α-methyl-17α-ethynylestradiol 3-aceate 17-phenylacetate (II).

Following the procedure of Example 22 but substituting other starting materials such as (1) 7α-methyl-17α-ethynylestradiol 17-propionate (II),
(2) 7α - methyl - 17α - (1-propynyl)estradiol 17-benzoate (II),
(3) 7α-methyl-17α-(1-butynyl)estradiol 17-valerate (II),
(4) 7α - methyl - 17α - (1 - pentynyl)estradiol 17-butyrate (II),
(5) 7α-methyl-17α-(1-hexynyl)estradiol 17 - cyclopentylpropionate (II), etc., yields, respectively, (1) 7α-methyl - 17α - ethynylestradiol 3-acetate 17-propionate (II),
(2) 7α-methyl - 17α - (1-propynyl)estradiol 3-acetate 17-benzoate (II),
(3) 7α-methyl-17α-(1-butynyl)estradiol 3-acetate 17-valerate (II),
(4) 7α-methyl - 17α - (1-pentynyl)estradiol 3-acetate 17-butyrate (II),
(5) 7α-methyl - 17α - (1-hexynyl)estradiol 3-acetate 17-cyclopentylpropionate (II), etc.

Substituting other acylating agents for acetic anhydride, e.g., propionic anhydride and benzoyl chloride yields the corresponding 3-acylates, e.g., 7α-methyl-17α-(1-propynyl)estradiol 3-propionate 17 - benzoate (II) and 7α-methyl-17α-(1-hexynyl)-estradiol 3-benzoate 17α-cyclopentylpropionate (II), etc.

As indicated above, the compounds of this invention are useful for their estrogenic activity. Administration in mammals depends on the particular compound involved, route of administration, severity of the condition being treated and the individual's response thereto. In general, a dose of between about 0.01 mg. to about 5 mgs. of each of the compounds exemplified in Examples 12 through 22 and embraced within Formula 11 is given orally once a day, or subcutaneously or intramuscularly in a dose of 0.05 to 10 mg. weekly to monthly, in the treatment of conditions incident to the foregoing activity when incorporated in conventional pharmaceutical compositions.

The following examples illustrate the incorporation of the active ingredients of this invention in pharmaceutical formulation for use as estrogenics.

Example 23.—Compressed tablets

A lot of 10,000 compressed tablets, each containing 0.05 mg. of 7α-methyl-17α-ethynylestradiol or 7α-methyl-17α-(1-propynyl)-estradiol 3 - methyl ether is prepared from the following ingredients:

|  | Gm. |
|---|---|
| 7α-methyl - 17α - ethynylestradiol or 7α - methyl-17α-(1-propynyl)estradiol 3-methyl ether | 0.5 |
| Dicalcium phosphate | 2500 |
| Methylcellulose, USP (15 cps.) | 65 |
| Talc, bolted | 450 |
| Calcium stearate, fine powder | 35 |

The 7α-methyl-17α-ethynylestradiol or 7α-methyl-17α-(1-propynyl)estradiol 3-methyl ether and dicalcium phosphate are mixed well, granulated with 7.5% solution of methylcellulose in water, passed through a No. 8 screen and dried at 120° F. The dried granules are passed through a No. 12 screen, mixed thoroughly with the talc and stearate and compressed into tablets.

Example 24.—Hard gelatin capsules

A lot of 1,000 hard gelating capsules, each containing 0.5 mg. of 7α-methyl-17α-ethynylestradiol or 7α-methyl-17α-(1-propynyl)estradiol 3-methyl ether is prepared from the following ingredients:

|  | Gm. |
|---|---|
| 7α - methyl-17α-ethynylestradiol or 7α-methyl-17α-(1-propynyl)estradiol 3-methyl ether | 0.5 |
| Lactose | 150 |
| Calcium stearate | 2 |
| Talc | 3 |

The lactose, talc and stearate are mixed well and incorporated into the mixture. The whole is mixed well and filled into two-piece hard gelating capsules.

Example 25.—Soft gelatin in capsules

A batch of 1,000 soft gelatin capsules, each containing 0.5 mg. of 7α-methyl-17α-ethynylestradiol or 7α-methyl-17α - (1-propynyl)-estradiol 3-methyl ether and corn oil is prepared from the following materials:

7α-methyl-17α-ethynylestradiol or 7α - methyl - 17α-(1-propynyl)estradiol 3-methyl ether—0.5 gm.
Corn oil—q.s.

A uniform dispersion of the active ingredient in the corn oil is prepared and the dispersion filled into soft gelatin capsules by conventional means.

Example 26.—Aqueous oral suspension

An aqueous oral suspension containing in each 5 ml. 0.5 mg. of 7α-methyl-17α-ethynylestradiol or 7α-methyl-17α - (1-propynyl)-estradiol 3-methyl ether is prepared from the following materials:

7α-methyl-17α-ethynylestradiol or 7α-methyl-17α-(1-propynyl)estradiol 3-methyl ether micronized—1.0 gm.
Methylparaben, USP—7.5 gm.
Propylparaben, USP—2.5 gm.
Saccharin sodium—12.5 gm.
Cyclamate sodium—2.5 gm.
Glycerin—3000 ml.
Trogacanth powder—100 gm.
Orange oil flavor—10 gm.
F.D. and C. orange dye—7.5 gm.
Deionized water, q.s. to 10,000 ml.

Example 27.—Aqueous suspension for injection

A suspending vehicle is prepared from the following materials:

Polyethylene glycol 400—30 gm.
Potassium chloride—11.2 gm.
Polysorbate 80—2 gm.
Methylparaben—1.8 gm.
Propylparaben—0.2 gm.
Water for injection q.s.—1000 ml.

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 0.5 g. of 7α-methyl-17α-ethynylestradiol or 7α-methyl-17α - (1 - propynyl)estradiol 3-methyl ether which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 0.5 mg. 7α-methyl - 17α - ethynylestradiol or 7α - methyl - 17α-(1-propynyl)estradiol 3-methyl ether.

As indicated above, the compounds of this invention, in addition to their use as estrogenics, when combined with with progestins, e.g., 6α-methyl-17α-hydroxyprogesterone progestins, e.g. 6α-methyl-17α-hydroxyprogesterone 17-acetate (Provera), 7α - methyl-17α-ethynyl-19-nortestosterone, 17α - hydroxy-6-methyl-16-methylene-4,6-pregnadiene-3,20-dione 17-acetate (Melengestrol acetate), etc., are useful for the prevention of ovulation in mammals. Administration to mammals depends on the particular progestin and estrogen involved and the individual's response thereto. In general, a dose of between about 0.01 mg. to about 5 mgs. of each of the estrogens exemplified in Examples 12 through 22 and embraced within Formula II plus between about 1 mg. to about 100 mgs. of a progestin is given at such time(s) in the mammalian ovulatory cycle as is suitable for the prevention of ovulation.

The following examples illustrate the incorporation of the active ingredients of this invention with progestins in pharmaceutical formulation for use as anovulatories.

Example 28.—Oral tablets 50,000 tablets for oral administration are prepared from the following types and amounts of materials. Each tablet contains 3.0 mgs. of 6α-methyl-17α-hydroxyprogesterone 17-acetate and 0.03 mg. of 7α-methyl-17α-ethynylestradiol or 7α-methyl-17α-(1-propynyl)estradiol 3-methyl ether.

6α-methyl-17α-hydroxyprogesterone 17-acetate—5 oz.
7α-methyl-17α-ethynylestradiol or 7α-methyl-17α-(1-propynyl)estradiol 3-methyl ether—23 grains
Lactose—3 lbs.

The finely powdered active ingredients and lactose are mixed well and granulated with syrup-starch paste. Starch and calcium stearate are used as lubricants in the compressing step.

Example 29.—Oral tablets 10,000 tablets for oral administration are prepared from the following types and amounts of ingredients. Each tablet contains 10 mgs. of 6α-methyl-17α-hydroxyprogesterone 17-acetate and 0.05 mg. of 7α-methyl-17α-ethynyl-estradiol or 7α-methyl-17α-(1-propynyl)estradiol 3-methyl ether.

| | Gms. |
|---|---|
| 6α-methyl-17α-hydroxyprogesterone 17-acetate | 100 |
| 7α-methyl-17α-ethynylestrone or 7α-methyl-17α-(1-propynyl)estrone 3-methyl ether | 0.5 |
| Lactose | 2600 |

The finely powdered active ingredients and lactose are mixed well and granulated with syrup-starch paste. Starch, talc, and calcium stearate are used as lubricants in the compressing step.

Example 30.—Oral aqueous suspension

An aqueous suspension for oral administration, containing in each teaspoonful (approximately 5 ml.) 5 mg. of 6α-methyl-17α-hydroxyprogesterone 17-acetate and 0.2 mg. of 7α-methyl-17α-ethynylestradiol or 7α-methyl-17α-(1-propynyl)estradiol 3-methyl ether is prepared from the following types and amounts of ingredients:

6α-methyl-17α-hydroxyprogesterone 17-acetate—1 gm.
7α-methyl - 17α - ethynylestradiol or 7α - methyl - 17α-(1-propynyl)estradiol 3 methyl ether—40 mgms.
Preservative—2 gms.
Flavor, q.s.
Purified water U.S.P., a.s. ad 1000 mls.

The preservative and flavor are dissolved in the water. The micronized active ingredients are added and the whole is homogenized.

Example 31.—Oral gelatin capsules 1,000 gelatin capsules for oral administration, each containing 10 mgs. of 6α-methyl-17α-hydroxyprogestrone 17-acetate and 0.05 mg. of 7α-methyl-17α-ethynylestradiol or 7α-methyl-17α-(1-propynyl)-estradiol 3-methyl ether are prepared from the following types and amounts of materials:

6α-methyl-17α-hydroxyprogesterone 17-acetate—10 gms.
7α-methyl-17α-ethynylestradiol or 7α-methyl-17α-(1-propynyl)estradiol 3-methyl ether—50 mgms.
Ingestible oil, q.s.

The micronized active ingredients and the oil are mixed and the mix is encapsulated by the usual techniques into gelatin capsules.

Example 32.—Oral tablets

Following the procedure of Example 28, 5,000 tablets are prepared from the following types and amounts of ingredients. Each tablet:

5 mgs. 6α-methyl-17α-hydroxyprogesterone 17-acetate—25 gms.
0.01 mg. 7α-methyl - 17α - ethynylestradiol or 7α-methyl-17α-(1-propynyl)estradiol 3-methyl ether—50 mgs.
150 mgs. lactose—750 gms.
3 mgs. acacia—15 gms.
65 mgs. starch, bolted—325 gms.
3 mgs. calcium stearate—15 gms.

Tablets equally suited for the inhibition of ovulation are prepared by using 250 and 1000 mgs., respectively, of the 7α-methyl-17α-ethynylestradiol or 7α-methyl-17α-(1-propynyl)estradiol 3-methyl ether in place of the 50 mgs. in the above formulation.

While the procedures described above in Examples 28 through 32 recite the use of the progestin 6α-methyl-17α-hydroxyprogesterone 17-acetate, other progestational compounds can be substituted therefor to provide similarly effective anovulatory pharmaceutical formulations; e.g., 7α-methyl-17α-ethynyl-19-nortestosterone, 17α-hydroxy-6-methyl-16-methylene-4,6-pregnadiene-3,20-dione 17 - acetate, 17-hydroxy-19-nor-17α-pregn-5(10)-en-20-yn-3-one, 19-nor - 17α - pregn-4-en-10-yne-3β, 17-diol 3,17-diacetate, 17-hydroxy-19-nor-17α-pregn-4-en-20-yn-3-one 17-acetate, 6α,21-dimethyl - 17β - hydroxy-4-pregnen-20-yn-3-one, 6-chloro-17α-hydroxy-4,6-pregnadiene-3,20-dione 17-acetate, etc., can be employed instead of 6α-methyl-17α-hydroxyprogesterone 17-acetate.

We claim:

1. 7α-methyl-17α-ethynylestradiol 3,17-bistrimethylsilyl ether having the formula

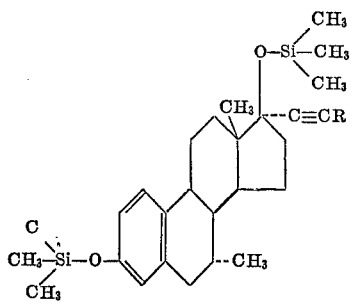

2. An oral pharmaceutical composition comprising:
(a) about 0.01 to about 5 mg. of a compound of the formula

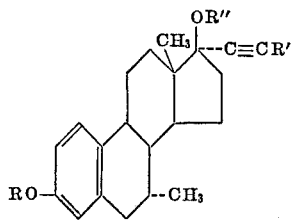

wherein R is selected from the group consisting of hydrogen, and methyl, R' is hydrogen and R" is hydrogen, and
(b) about 1 to about 100 mg. of "a progestin," dispersed in an oral pharmaceutical carrier.

3. A composition in accordance with claim 2 wherein the progestin is 7α-methyl-17α-ethynyl-19-nortestosterone.

4. A method of preventing ovulation in ovulating mammals comprising: orally administering to mammals an effective amount of
(a) a compound of the formula

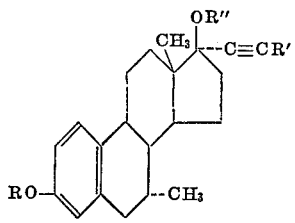

wherein R is selected from the group consisting of hydrogen and methyl, R' is hydrogen and R" is hydrogen, and
(b) a progestin.

5. A method of preventing ovulation in mammals in accordance with claim 11 wherein the progestin is 7α-methyl-17α-ethynyl-19-nortestosterone.

References Cited

UNITED STATES PATENTS

| 3,318,928 | 5/1967 | Anner et al. | 260—397.5 |
| 3,342,682 | 9/1967 | Ercoli | 260—397.4 |

FOREIGN PATENTS

| 1,434,174 | 2/1966 | France | 260—397.5 |

ELBERT L. ROBERTS, Primary Examiner

U.S. Cl. X.R.

260—239.55, 397.4, 397.5; 195—51

UNITED STATES PATENT OFFICE
CERTIFICATE OF CORRECTION

Patent No. 3,642,992      Dated February 15, 1972

Inventor(s) John C. Babcock et al.

It is certified that error appears in the above-identified patent and that said Letters Patent are hereby corrected as shown below:

Column 1, line 36, for "$\begin{smallmatrix}R_1\\R_2NSi\\R_3\end{smallmatrix}$" read -- $\begin{smallmatrix}R_1\\R_2-Si\\R_3\end{smallmatrix}$ --. Column 2, line 19, for "anhydried" read -- anhydride --. Column 14, line 46, for "gelatin in capsules" read -- gelatin capsules --. Column 15, line 5, for "400" read -- 4000 --. Column 17, lines 11 and 15, should appear as shown below instead of as in the patent:

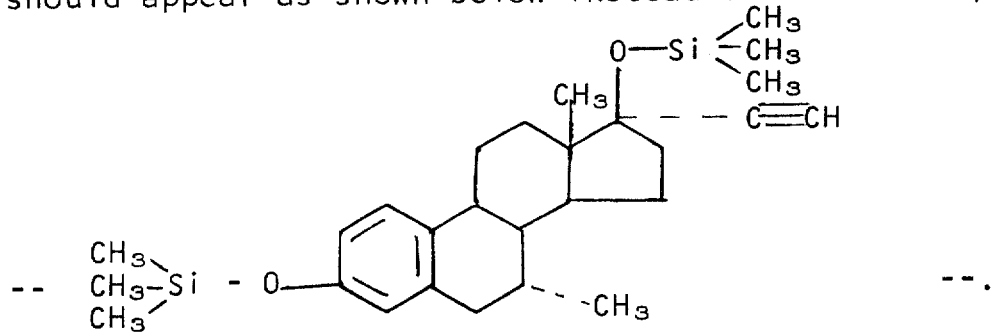

Column 17, line 39, claim 2, for ""a progestin,"" read -- a progestin --. Column 18, line 23, claim 5, for "claim 11" read -- claim 4 --.

Signed and sealed this 22nd day of August 1972.

(SEAL)
Attest:

EDWARD M. FLETCHER, JR.          ROBERT GOTTSCHALK
Attesting Officer                  Commissioner of Patents